US011057839B1

(12) United States Patent
Saha et al.

(10) Patent No.: US 11,057,839 B1
(45) Date of Patent: Jul. 6, 2021

(54) WIRELESS COMMUNICATION TRANSMIT POWER CONTROL BASED ON HYBRID AUTOMATIC REPEAT REQUEST (HARQ) BLOCK ERROR RATE (BLER)

(71) Applicant: T-MOBILE INNOVATIONS LLC, Overland Park, KS (US)

(72) Inventors: Sougata Saha, Overland Park, KS (US); Kavitha Swaminathan, Olathe, KS (US); Beth D. Webb, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/799,400

(22) Filed: Feb. 24, 2020

(51) Int. Cl.
*H04W 52/20* (2009.01)
*H04W 52/24* (2009.01)
*H04L 1/18* (2006.01)

(52) U.S. Cl.
CPC ........... *H04W 52/20* (2013.01); *H04L 1/1812* (2013.01); *H04W 52/242* (2013.01)

(58) Field of Classification Search
CPC ..... H04W 52/20; H04W 74/02; H04W 16/14; H04W 52/242
See application file for complete search history.

(56) References Cited

U.S. PATENT DOCUMENTS

| 9,706,448 | B2 | 7/2017 | Naik et al. |
| 10,485,048 | B2 | 11/2019 | Zeng et al. |
| 2017/0094597 | A1 | 3/2017 | Su et al. |
| 2018/0331803 | A1 | 11/2018 | Wang et al. |
| 2019/0037560 | A1* | 1/2019 | Huang ............... H04W 52/365 |
| 2019/0069205 | A1 | 2/2019 | Lee et al. |
| 2019/0069325 | A1 | 2/2019 | Yerramalli et al. |
| 2019/0313343 | A1 | 10/2019 | MolavianJazi et al. |
| 2019/0349867 | A1 | 11/2019 | MolavianJazi et al. |

* cited by examiner

Primary Examiner — Keith Ferguson (57) ABSTRACT

A Fifth Generation New Radio (5GNR)/Long Term Evolution (LTE) User Equipment (UE) controls power consumption. The 5GNR/LTE UE selects a 5GNR transmit power and an LTE transmit power. The UE transmits 5GNR signals at the 5GNR transmit power and transmits LTE signals at the LTE transmit power. The UE averages Uplink (UL) Hybrid Automatic Repeat Request (HARQ) Block Error Rate (BLER) for an error sampling period. The UE compares the average UL HARQ BLER to an error threshold. When the average UL HARQ BLER exceeds the threshold, the UE decreases 5GNR transmit power and increases LTE transmit power. The UE may average UL path loss for a loss sampling period and compare the average UL path loss to a loss threshold. The UE may decrease 5GNR transmit power and increase LTE transmit power when the UL HARQ BLER and the UL path loss both exceed their thresholds.

20 Claims, 8 Drawing Sheets

WIRELESS COMMUNICATION TRANSMIT POWER CONTROL BASED ON HYBRID AUTOMATIC REPEAT REQUEST (HARQ) BLOCK ERROR RATE (BLER)

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless access nodes that exchange wireless signals with the wireless user devices over radio frequencies using wireless network protocols. Exemplary wireless network protocols include Long Term Evolution (LTE) and Fifth Generation New Radio (5GNR).

Many wireless user devices rely on battery power—especially when they are mobile. To conserve battery power and control interference, the wireless access nodes control the transmit power used by the wireless user devices. The wireless user devices typically have a maximum transmit power. The wireless access nodes transfer power control instructions to decrease in steps from the maximum power or increase in steps toward the maximum power. A wireless access node typically controls the uplink transmit power of the wireless user devices so all of the user devices have the same uplink receive power at the wireless access node. A wireless access node decreases the uplink transmit power for wireless user devices that are near the wireless access node and have a clear signal path. The wireless access node increases the uplink transmit power for other wireless user devices that are far from the wireless access node or that have a heavily-obstructed signal path. The distance and the obstructions between a wireless user device and its serving wireless access node attenuate the uplink wireless transmissions from the wireless user device to the serving access node. The difference between the uplink transmit power at the wireless user device and the uplink receive power at the serving access node is the uplink path loss. The wireless access nodes determine the uplink path loss for the wireless user devices that they serve and use the uplink path loss to exert transmit power control. The wireless access nodes indicate the uplink path loss to the wireless user devices along with their power control instructions.

The wireless access nodes and the wireless user devices perform error correction over the wireless links. A popular form of error correction is Hybrid Automatic Repeat Request (HARQ). To perform HARQ, the transmitter wirelessly transmits data blocks that have sequence numbers. The receiver wirelessly receives most of the data blocks. The receiver wirelessly transmits acknowledgements back to the transmitter for the data blocks that it successfully receives. The receiver also wirelessly transmits requests back to the transmitter for the data blocks that are missing from the sequence. The transmitter wirelessly retransmits the data blocks that are requested by the receiver and/or that not acknowledged by the receiver. The HARQ Block Error Rate (BLER) comprises a ratio of the amount of retransferred data blocks to the amount of transferred data blocks.

Unfortunately, the wireless user devices that simultaneously use both 5GNR and LTE rapidly deplete their battery power. Moreover, the wireless user devices do not efficiently and effectively use uplink HARQ BLER to control their uplink transmit power and conserve their battery power.

TECHNICAL OVERVIEW

A Fifth Generation New Radio (5GNR)/Long Term Evolution (LTE) User Equipment (UE) controls power consumption. The 5GNR/LTE UE selects a 5GNR transmit power and an LTE transmit power. The UE transmits 5GNR signals at the 5GNR transmit power and transmits LTE signals at the LTE transmit power. The UE averages Uplink (UL) Hybrid Automatic Repeat Request (HARQ) Block Error Rate (BLER) for an error sampling period. The UE compares the average UL HARQ BLER to an error threshold. When the average UL HARQ BLER exceeds the threshold, the UE decreases 5GNR transmit power and increases LTE transmit power. The UE may average UL path loss for a loss sampling period and compare the average UL path loss to a loss threshold. The UE may decrease 5GNR transmit power and increase LTE transmit power when the UL HARQ BLER and the UL path loss both exceed their thresholds.

DETAILED DESCRIPTION

Figure 1:
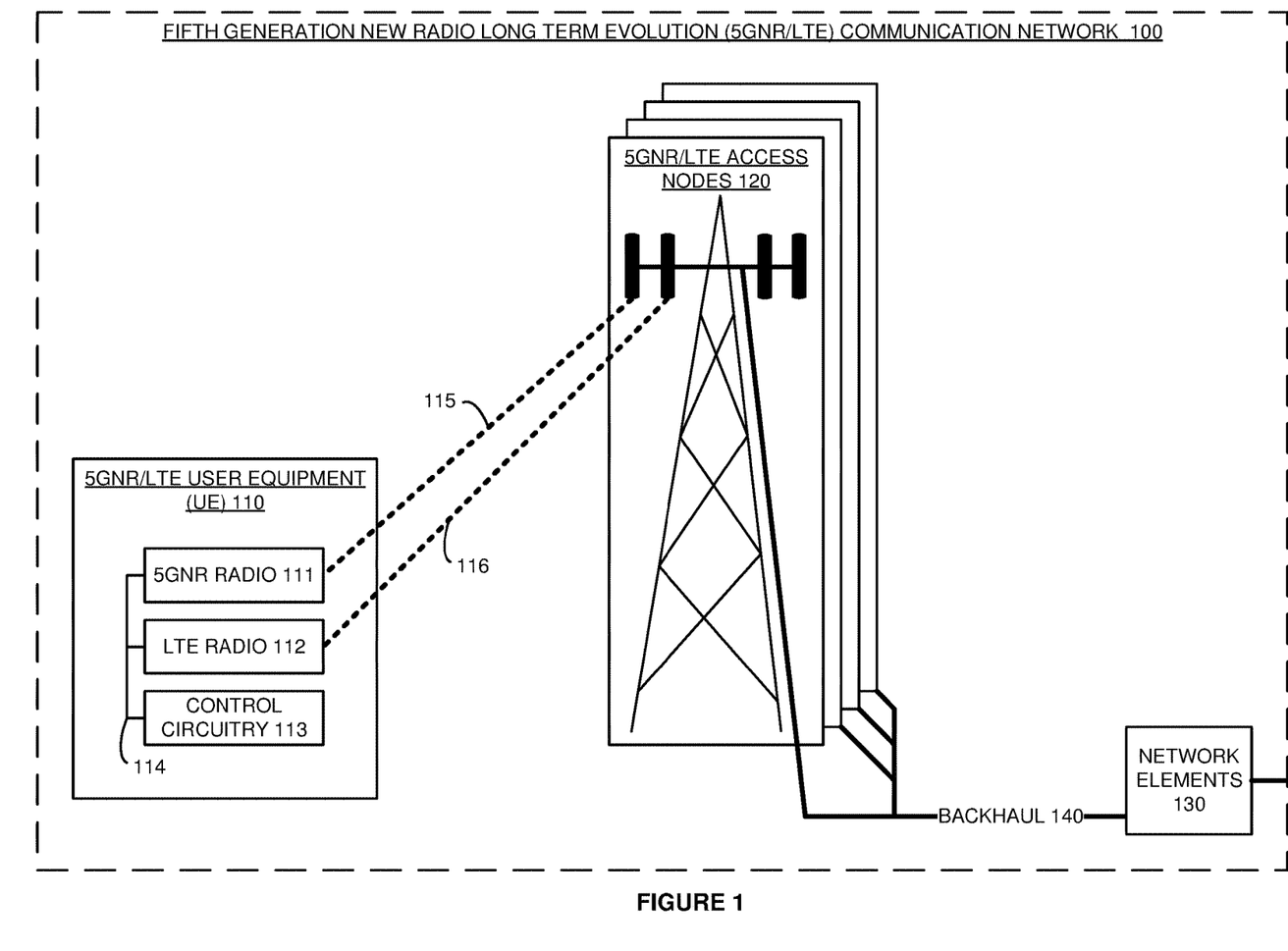
FIG. 1 illustrates a Fifth Generation New Radio (5GNR)/Long Term Evolution (LTE) User Equipment (UE) that controls power consumption based on Uplink (UL) Hybrid Automatic Repeat Request (HARQ) Block Error Rate (BLER).

FIG. 1 illustrates Fifth Generation New Radio (5GNR)/Long Term Evolution (LTE) User Equipment (UE) 110 that controls its power consumption based on Uplink (UL) Hybrid Automatic Repeat Request (HARQ) Block Error Rate (BLER) in 5GNR/LTE communication network 100. In some examples, the UL path loss is also used to control the power consumption. 5GNR/LTE communication network 100 supports wireless data services like internet-access, media-streaming, messaging, gaming, machine-communications, and/or some other wireless data product. 5GNR/

LTE communication network 100 comprises 5GNR/LTE UE 110, 5GNR/LTE access nodes 120, network elements 130, and backhaul 140.

5GNR/LTE UE 110 is coupled to 5GNR/LTE access nodes 120 over wireless 5GNR links 115 and wireless LTE links 116. Wireless links 115-116 use frequencies in the low-band, mid-band, high-band, or some other part or the wireless electromagnetic spectrum. 5GNR/LTE access nodes 120 are coupled to one another and to network elements 130 over backhaul 140. Backhaul 140 may use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, and/or some other networking protocols.

5GNR/LTE UE 110 might be a phone, computer, wearable transceiver, robot, vehicle, and/or some other data appliance with wireless communication circuitry. 5GNR/LTE UE 110 comprises 5GNR radio 111, LTE radio 112, and control circuitry 113 which are coupled over bus circuitry 114. Radios 111-112 comprise antennas, filters, amplifiers, analog-to-digital interfaces, microprocessors, memory, software, transceivers, bus circuitry, and the like. Control circuitry 113 comprises microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, user applications, and network applications.

5GNR/LTE access nodes 120 comprise radios and Baseband Units (BBUs) which are coupled over bus circuitry. The radios comprise antennas, filters, amplifiers, analog-to-digital interfaces, microprocessors, memory, software, transceivers, bus circuitry, and the like. The BBUs comprise microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems and network applications.

Network elements 130 comprise microprocessors, memory, software, and bus interfaces. The microprocessors comprise CPU, GPU, ASIC, and/or the like. The memory comprises RAM, flash circuitry, disk drive, and/or the like. The memory stores software like operating system and network applications. Exemplary network elements 130 include Access and Mobility Management Functions (AMFs), Session Management Functions (SMFs), Mobility Management Entities (MMEs), User Plane Functions (UPFs), Serving Gateways (SGWs), Packet Data Network Gateways (PGWs), and/or the like. In some examples, network elements 130 comprise Virtual Network Functions (VNFs) in a Network Function Virtualization Infrastructure (NFVI).

In 5GNR/LTE UE 110, control circuitry 113 receives transmit power instructions from 5GNR/LTE access nodes 120 to increase or decrease the UL 5GNR transmit power and the UL LTE transmit power. This network power control is primarily based on the distance and the obstructions between UE 110 and the serving ones of access nodes 120. 5GNR/LTE access nodes 120 increase the UL transmit power of 5GNR/LTE UE 110 as UE 110 moves further away or moves behind more obstructions. Control circuitry 113 selects an UL 5GNR transmit power and an UL Long Term Evolution (LTE) transmit power based on the network power control from 5GNR/LTE access nodes 120, the UL HARQ BLER, and possibly the UL path loss.

In 5GNR/LTE UE 110, control circuitry 113 signals the selected 5GNR transmit power to 5GNR radio 111. Control circuitry 113 signals the selected LTE transmit power to LTE radio 112. 5GNR radio 111 transmits UL 5GNR signals over 5GNR links 115 at the selected 5GNR transmit power. LTE radio 112 transmits UL LTE signals over LTE links 116 at the selected LTE transmit power.

During the UL signal transmissions, 5GNR/LTE UE 110 and 5GNR/LTE access nodes 120 perform UL HARQ. To perform UL HARQ, 5GNR/LTE access nodes 120 wirelessly receive data blocks from UE 110, and access nodes 120 wirelessly return acknowledgements to UE 110 for the data blocks that are accurately received. 5GNR/LTE UE 110 retransfers a given data block to 5GNR/LTE access nodes 120 when its corresponding acknowledgement is not timely received. 5GNR/LTE UE 110 adds sequence numbers to the transferred data blocks, and 5GNR/LTE access nodes 120 wirelessly request the retransmission of any data blocks that are missing from the received sequence. 5GNR/LTE UE 110 wirelessly retransfers the missing data blocks per the requests. The HARQ Block Error Rate (BLER) comprises a ratio of the amount of retransferred data blocks to the amount of transferred data blocks. For example, the BLER is 10% when 100 data block are transmitted and 10 of the data blocks are retransmitted.

Control circuitry 113 averages the UL BLER during an error sampling period like 100 milliseconds. The UL BLER may be for the LTE UL, 5GNR UL, or both. Control circuitry 113 compares the average UL HARQ BLER to an error threshold like 15%. When the average UL HARQ BLER exceeds the error threshold, control circuitry 113 decreases the 5GNR UL transmit power and increases the LTE UL transmit power. In some examples, the LTE UL transmit power is increased by three decibels while the 5GNR UL transmit power is reduced to zero. Control circuitry 113 signals the lower 5GNR transmit power (maybe zero) to 5GNR radio 111. Control circuitry 113 signals the higher LTE transmit power to LTE radio 112. LTE radio 112 transmits subsequent LTE signals over LTE link 116 at the higher LTE transmit power subject to network power control at the new UL transmit power level. 5GNR radio 111 transmits subsequent 5GNR signals over 5GNR link 115 at the lower 5GNR transmit power, and radio 111 stops 5GNR UL transmission if the 5GNR transmit power is zero. The 5GNR UL transmit power and the LTE UL transmit power may be subsequently reset to their original values based on network power control, UL BLER, and possibly UL path loss.

In some examples, 5GNR/LTE access nodes 120 calculate UL path loss over wireless links 115-116 and report the path loss to control circuitry 113. The UL path loss over links 115-116 comprises the difference between the UL transmission power at UE 110 and the UL reception power at access nodes 120. The UL path loss data could be for 5GNR link 115, LTE link 116, or both. Control circuitry 113 averages the UL path loss for a loss sampling period and compares the average UL path loss to a loss threshold. Control circuitry 113 may then decrease the 5GNR UL transmit power and increase the LTE UL transmit power when both the average UL HARQ BLER exceeds the error threshold and the average UL path loss exceeds the loss threshold.

Figure 2:
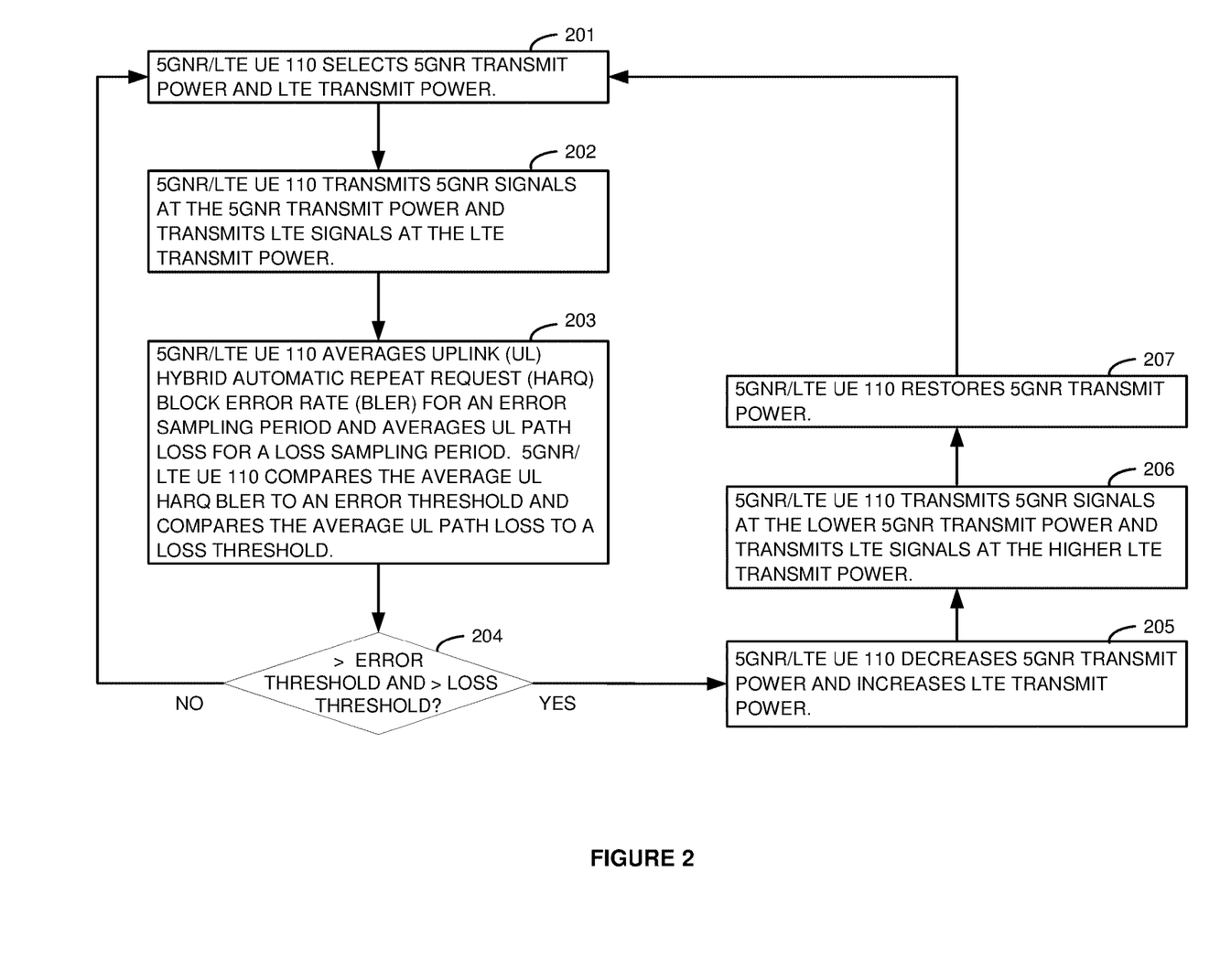
FIG. 2 illustrates the operation of the 5GNR/LTE UE to control power consumption based on UL HARQ BLER.

FIG. 2 illustrates the operation of 5GNR/LTE UE 110 to control power consumption based on UL HARQ BLER. Path loss on the UL is used in this example, but UL path loss may be used differently or not be used in other examples. In this example, the 5GNR UL transmit power is decreased and increased, but the 5GNR UL transmit power may be turned off and on in other examples. 5GNR/LTE UE 110 selects an UL 5GNR transmit power and an UL LTE transmit power (201). The transmit power selections are usually made based on instructions from 5GNR/LTE access nodes 120. 5GNR/LTE UE 110 transmits UL 5GNR signals over 5GNR links 115 at the selected 5GNR transmit power and transmits UL LTE signals over LTE links 116 at the selected LTE transmit power (202). During the UL signal transmissions, 5GNR/LTE UE 110 determines UL HARQ and UL path loss. Control circuitry 113 averages the UL BLER during an error sampling period (203). Control circuitry 113 averages the UL path loss during a loss sampling period. Control circuitry 113 compares the average UL HARQ BLER to an error threshold and compares the average UL path loss to a loss threshold. When the average UL HARQ BLER exceeds the error threshold and the average UL path loss exceeds the loss threshold (204), control circuitry 113 decreases the 5GNR transmit power and increases the LTE transmit power (205). 5GNR/LTE UE 110 transmits subsequent LTE signals at the higher LTE transmit power (206). If there is any 5GNR transmit power, then 5GNR/LTE UE 110 transmits subsequent 5GNR signals at the lower 5GNR transmit power. The 5GNR transmit power may be restored based on a time schedule, network power control, UL BLER, and UL path loss, and/or some other factors (207). The operation repeats (201).

Figure 3:
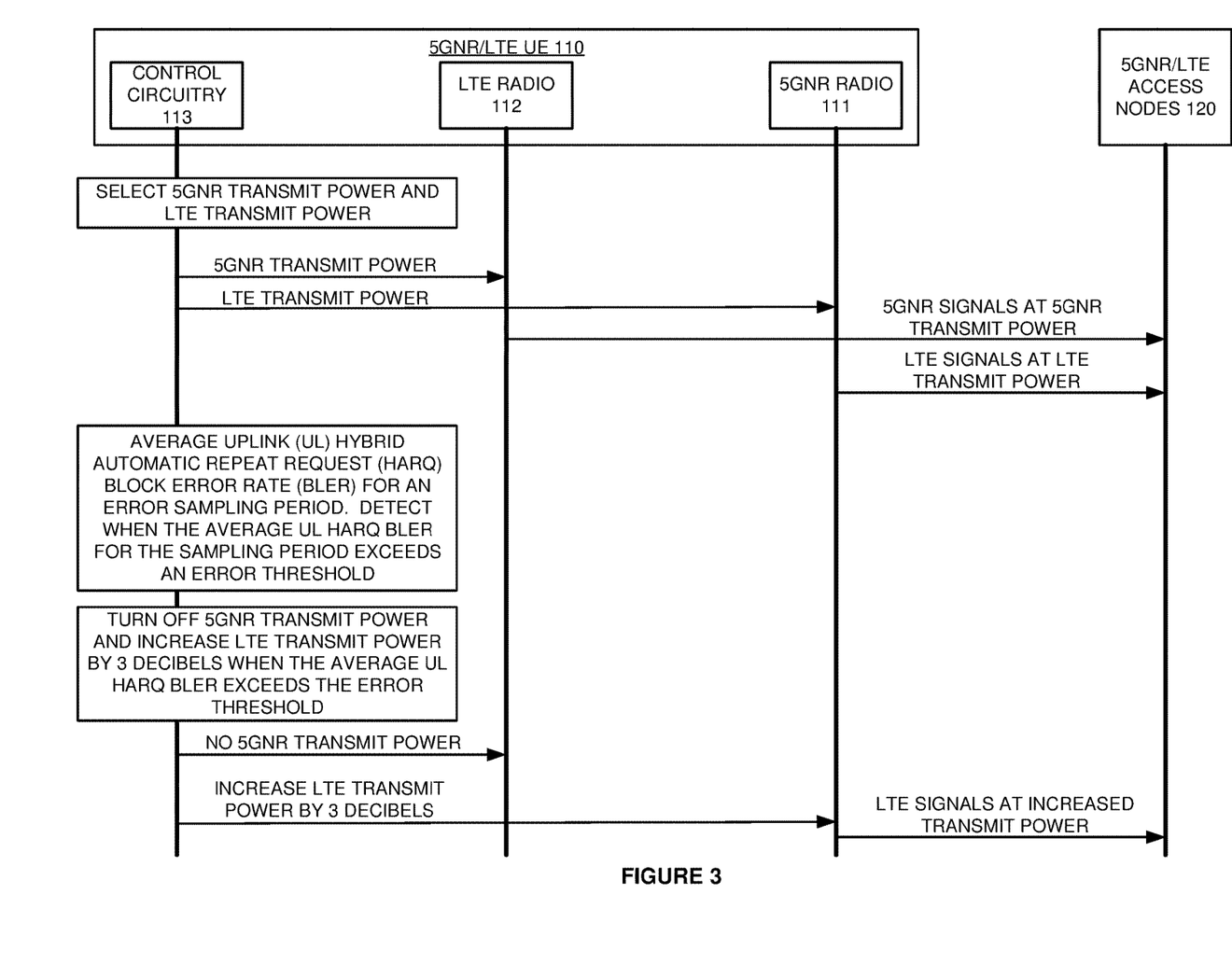
FIG. 3 illustrates the operation of the 5GNR/LTE UE to control power consumption based on UL HARQ BLER.

FIG. 3 illustrates the operation of 5GNR/LTE UE 110 to control power consumption based on UL HARQ BLER. In this example, the UL path loss is not used for power control, but the UL path loss could be used in other examples. In this example, the 5GNR UL transmit power is turned off and on, but the 5GNR UL transmit power could be decreased and increased in other examples. In 5GNR/LTE UE 110, control circuitry 113 selects a 5GNR UL transmit power and an LTE UL transmit power—typically based on network power control from 5GNR/LTE access nodes 120. Control circuitry 113 signals the selected 5GNR transmit power to 5GNR radio 111 and signals the selected LTE transmit power to LTE radio 112. 5GNR radio 111 transmits 5GNR UL signals at the selected 5GNR transmit power, and LTE radio 112 transmits LTE UL signals at the selected LTE transmit power. Control circuitry 113 averages the UL BLER during an error sampling period. In this example, the error sampling period is greater than 90 milliseconds and less than 110 milliseconds. The UL BLER determination may be for the LTE UL, 5GNR UL, or both. Control circuitry 113 detects when the average UL HARQ BLER exceeds the error threshold. When the average UL HARQ BLER exceeds the error threshold, control circuitry 113 turns off the 5GNR transmit power and increases the LTE transmit power by three decibels. Control circuitry 113 signals a power off instruction to 5GNR radio 111 for the UL, and 5GNR radio 111 stops the wireless transmission of 5GNR signals. Control circuitry 113 signals the three decibel power increase to LTE radio 112, and LTE radio 112 transmits LTE signals at the increased LTE UL transmit power.

Advantageously, 5GNR/LTE UE 410 uses both 5GNR and LTE while also processing uplink HARQ BLER to efficiently control uplink transmit power and effectively conserve battery power.

Figure 4:
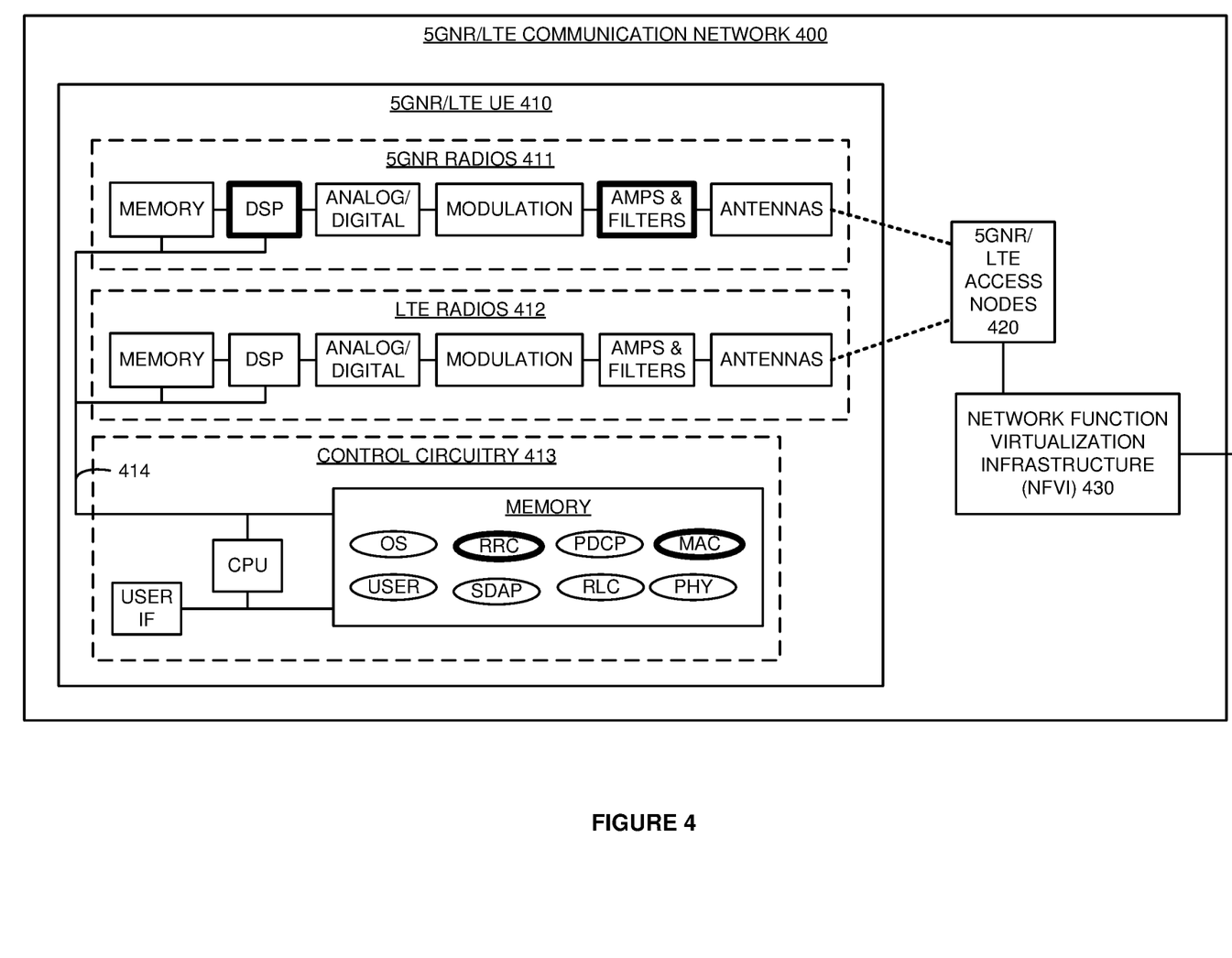
FIG. 4 illustrates a 5GNR/LTE UE to control power consumption based on UL HARQ BLER and UL path loss in a 5GNR/LTE communication network.

FIG. 4 illustrates 5GNR/LTE UE 410 to control power consumption based on UL HARQ BLER and UL path loss in 5GNR/LTE communication network 400. 5GNR/LTE UE 410 is an example of 5GNR/LTE UE 110, although UE 110 may differ. 5GNR/LTE communication network 400 comprises 5GNR/LTE 410, 5GNR/LTE access nodes 420, and Network Function Virtualization Infrastructure (NFVI) 430. 5GNR/LTE UE 410 comprises 5GNR radios 411, LTE radios 412, and control circuitry 413 which are interconnected over bus circuitry 414.

Radios 411-412 comprise antennas, amplifiers, filters, modulation, analog-to-digital interfaces, DSP, and memory that are coupled over bus circuitry. The antennas in 5GNR/LTE UE 410 are wirelessly coupled to 5GNR/LTE access nodes 420 over wireless 5GNR links and wireless LTE links. Control circuitry 413 comprises user interfaces (IF), CPU, and memory. The memory in user circuitry 413 stores an operating system, user applications, and network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). The CPU executes the operating system, user applications, and network applications to exchange signaling and data between the user applications and the network applications. The CPU executes the operating system and network applications to wirelessly exchange corresponding signaling and data with 5GNR/LTE access nodes 420 over 5GNR/LTE radios 411-412.

In radios 411-412, the antennas receive wireless 5GNR/LTE signals from 5GNR/LTE access nodes 420 that transport DL 5GNR/LTE signaling and DL 5GNR/LTE data. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSPs. The DSPs recover DL 5GNR/LTE symbols from the DL digital signals. The CPU executes the network applications to process the DL 5GNR/LTE symbols and recover the DL 5GNR/LTE signaling and the 5GNR/LTE DL data. The RRCs transfer corresponding DL user signaling to the operating system/user applications. The SDAP and PDCP transfer corresponding DL user data to the operating system/user applications.

The SDAP and PDCP receive UL user data from the operating system/user applications. The RRCs receive UL signaling from the operating system/user applications. The RRCs process the UL user signaling and the DL 5GNR/LTE signaling to generate new DL user signaling and new UL 5GNR/LTE signaling. The network applications process the UL 5GNR/LTE signaling and the UL 5GNR/LTE data to generate corresponding UL 5GNR/LTE symbols. The network applications like RRC and MAC also exert transmit power control. In radios 411-412, the DSPs process the UL 5GNR/LTE symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals to the selected UL transmit power levels. The filters attenuate unwanted out-of-band energy and transfer the filtered UL signals through duplexers to the antennas. The electrical UL signals drive the antennas to emit corresponding wireless 5GNR/LTE signals that transport the UL 5GNR/LTE signaling and UL 5GNR/LTE data to 5GNR/LTE access nodes 420.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In 5GNR/LTE UE 410, the 5GNR MAC selects an UL 5GNR transmit power based on power control instructions from 5GNR/LTE access nodes 420 received by the 5GNR RRC. The 5GNR MAC signals the selected 5GNR transmit power to the DSP in 5GNR radios 411. In 5GNR radios 411, the DSP directs the amplifiers to boost the 5GNR UL transmit signals to the selected 5GNR transmit power. The LTE MAC selects an UL LTE transmit power based on power control instructions from 5GNR/LTE access nodes 420 received by the LTE RRC. The LTE MAC signals the selected LTE transmit power to the DSP in LTE 5GNR radios 412. In LTE radios 412, the DSP directs the amplifiers to boost the LTE UL transmit signals to the selected LTE transmit power. 5GNR radios 411 transmit the UL 5GNR signals at the selected 5GNR transmit power, and LTE radios 412 transmit the UL LTE signals at the selected LTE transmit power.

The LTE MAC performs HARQ on the LTE UL. The 5GNR MAC performs HARQ on the 5GNR UL. The LTE MAC averages the UL LTE BLER for approximately 100 milliseconds and notifies the LTE RRC. The 5GNR MAC averages the UL 5GNR BLER for approximately 100 milliseconds and notifies the 5GNR RRC.

5GNR/LTE access nodes 420 determine 5GNR UL path loss and LTE UL path loss for 5GNR/LTE UE 410. 5GNR/LTE access nodes 420 transfer the 5GNR UL path loss metrics to the 5GNR RRC in 5GNR/LTE UE 410. 5GNR/LTE access nodes 420 transfer the LTE UL path loss metrics to the LTE RRC in 5GNR/LTE UE 410. The 5GNR RRC in UE 410 averages the UL 5GNR path loss for approximately 100 milliseconds. The LTE RRC in UE 410 averages the UL LTE path loss for approximately 100 milliseconds.

In 5GNR/LTE UE 410, the 5GNR RRC compares the average 5GNR UL HARQ BLER to a 5GNR error threshold and compares the average 5GNR UL path loss to a loss threshold. The LTE RRC compares the average LTE UL HARQ BLER to an LTE error threshold and compares the average LTE UL path loss to a loss threshold. The 5GNR RRC notifies the LTE RRC when the 5GNR UL HARQ BLER and the 5GNR UL path loss both exceed their error thresholds. The LTE RRC notifies the 5GNR RRC when the LTE UL HARQ BLER and the LTE UL path loss both exceed their error thresholds. When the 5GNR UL HARQ BLER, the LTE UL HARQ BLER, the 5GNR UL path loss, and the LTE UL path loss all exceed their thresholds, the LTE RRC directs the LTE MAC to increase LTE UL transmit power by three decibels, and the 5GNR RRC directs the 5GNR MAC to decrease 5GNR UL transmit power to zero.

The 5GNR MAC signals the DSP in 5GNR radios 411 to power-down, and the 5GNR DSP powers down one or more 5GNR amplifiers to reduce power consumption. The LTE MAC signals the DSP in LTE radios 412 to power-up, and the LTE DSP increases the gain by three decibels for one or more of the LTE amplifiers to improve the LTE UL quality. The amplifiers in LTE radios 411 amplify the UL LTE signals by an additional three decibels before wireless transmission.

In response to the 5GNR UL power-off, the 5GNR RRC in UE 410 signals the AMF in NFVI 430 over access nodes 120 to terminate 5GNR service. For example, the 5GNR RRC in UE 410 may transfer a Tracking Area Update (TAU) that has the instruction to disable 5GNR service in response to 5GNR UL power-off. The AMF in NFVI 430 terminates the 5GNR service for UE 410 responsive to the TAU. Alternatively, the LTE RRC in UE 410 may signal the MME in NFVI 430 over access nodes 120 to terminate 5GNR service. For example, the LTE RRC in UE 410 may transfer a TAU that has the instruction to disable 5GNR service, and the MME in NFVI 430 signals the AMF to terminate the 5GNR service for UE 410 responsive to the TAU.

The LTE MAC performs HARQ on the LTE UL, averages the UL LTE BLER for approximately 100 milliseconds, and notifies the LTE RRC. 5GNR/LTE access nodes 420 determine LTE UL path loss for 5GNR/LTE UE 410 and transfer the LTE UL path loss metrics to the LTE RRC in 5GNR/LTE UE 410. The LTE RRC in UE 410 averages the UL LTE path loss for approximately 100 milliseconds. The LTE RRC compares the average LTE UL HARQ BLER to a 5GNR restoration threshold and compares the average LTE UL path loss to a 5GNR restoration threshold. The LTE RRC notifies the 5GNR RRC when the LTE UL HARQ BLER and the LTE UL path loss fall below the 5GNR restoration thresholds. When the LTE UL HARQ BLER and the LTE UL path loss both fall below the 5GNR restoration thresholds, the LTE RRC directs the LTE MAC to decrease LTE UL transmit power by three decibels, and the 5GNR RRC directs the 5GNR MAC to increase 5GNR UL transmit power back to a default value like 23 decibels. The 5GNR MAC signals the DSP in 5GNR radios 411 to power-up, and the 5GNR DSP powers up one or more of the 5GNR amplifiers. The LTE MAC signals the DSP in LTE radios 412 to power-down, and the LTE DSP decreases the gain by three decibels for the one or more of the LTE amplifiers.

In response to the 5GNR UL power-on, the 5GNR RRC in UE 410 signals the AMF in NFVI 430 over access nodes 120 to restart the 5GNR service. For example, the 5GNR RRC in UE 410 may transfer a TAU that has the instruction to enable the 5GNR service in response to 5GNR UL power-on. The AMF in NFVI 430 restarts the 5GNR service for UE 410 responsive to the TAU. Alternatively, the LTE RRC in UE 410 may signal the MME in NFVI 430 over access nodes 120 to restart the 5GNR service. For example, the LTE RRC in UE 410 may transfer a TAU that has the instruction to restart the 5GNR service, and the MME in NFVI 430 signals the AMF to restart the 5GNR service for UE 410 responsive to the TAU.

Figure 5:
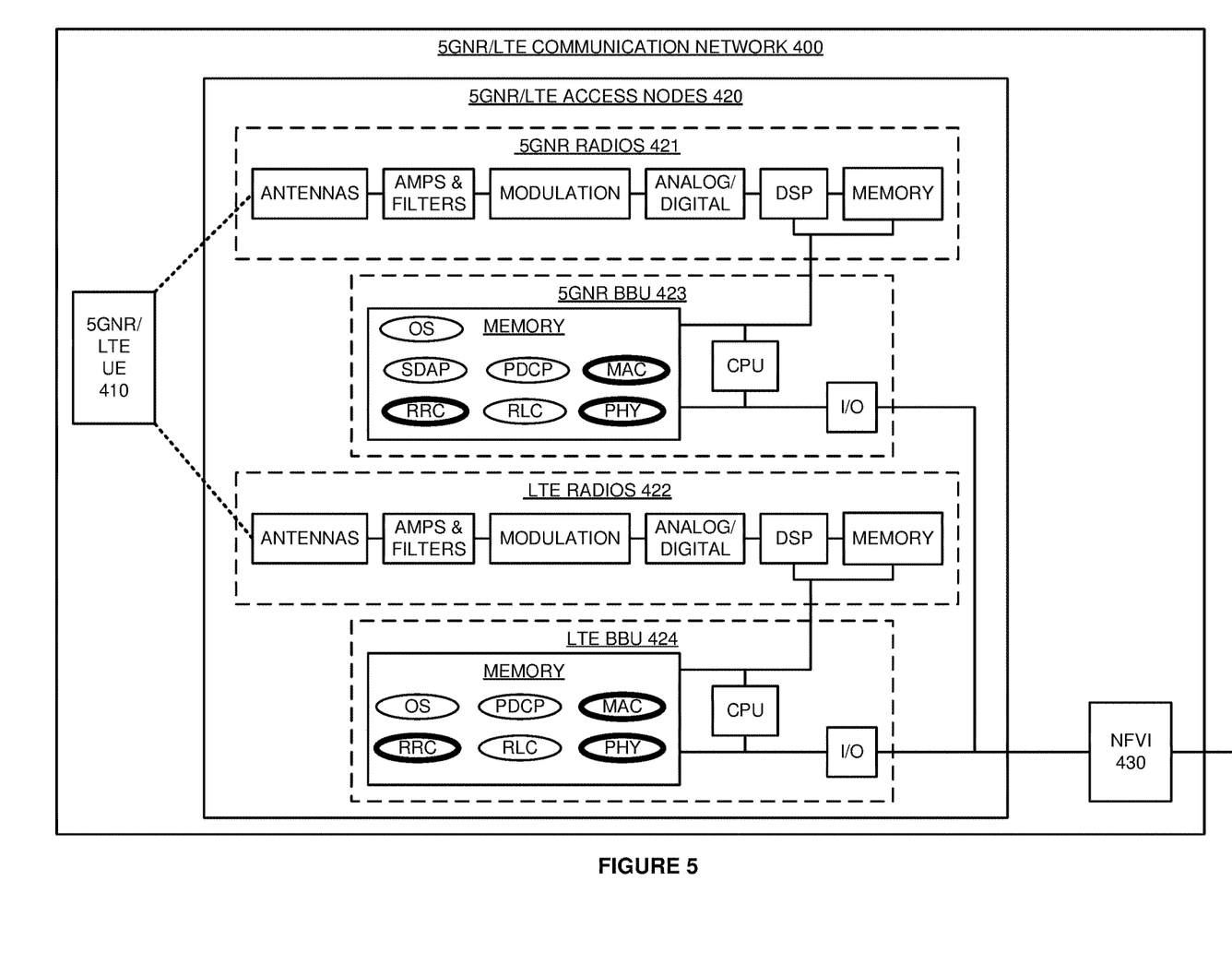
FIG. 5 illustrates 5GNR/LTE access nodes in the 5GNR/LTE communication network that serve the 5GNR/LTE UE which controls power consumption based on UL HARQ BLER and UL path loss.

FIG. 5 illustrates 5GNR/LTE access nodes 420 in 5GNR/LTE communication network 400 that serves 5GNR/LTE UE 410 which controls power consumption based on UL HARQ BLER and UL path loss. 5GNR/LTE access nodes 420 are an example of 5GNR/LTE access nodes 120, although nodes 120 may differ. 5GNR/LTE access nodes 420 comprise 5GNR radios 421, LTE radios 422, 5GNR Baseband Unit (BBU) 423, and LTE BBU 424. Radios 421-422 comprise antennas, amplifiers, filters, modulation, analog-to-digital interfaces, DSP, and memory that are coupled over bus circuitry. BBUs 423-424 comprises memory, CPU, and data Input/Output (I/O) that are coupled over bus circuitry.

5GNR/LTE UE 410 is wirelessly coupled to the antennas in radios 421-422. Radios 421-422 and BBUs 423-424 are coupled over data links like Common Public Radio Interface (CPRI) or some other network protocol. The data I/Os in BBUs 423-423 are coupled over backhaul links to NFVI 430. In BBUs 423-424, the memories store operating systems, PHY, MAC, RLC, PDCP, SDAP, and RRC. The CPUs execute the PHY, MAC, RLC, PDCP, SDAP, and RRC to drive the exchange of data and signaling between 5GNR/LTE UE 410 and NFVI 430 over radios 421-422.

In radios 421-422, the antennas receive wireless signals from 5GNR/LTE UE 410 that transport UL 5GNR/LTE signaling and UL 5GNR/LTE data. The antennas transfer corresponding electrical UL signals through duplexers to the amplifiers. The amplifiers boost the received UL signals for filters which attenuate unwanted energy. In modulation, demodulators down-convert the UL signals from the their carrier frequencies. The analog/digital interfaces convert the analog UL signals into digital UL signals for the DSP. The DSP recovers UL 5GNR/LTE symbols from the UL digital signals. In BBUs 423-424, the CPUs execute the network applications to process the UL 5GNR/LTE symbols and recover UL 5GNR/LTE signaling and UL 5GNR/LTE data.

In 5GNR BBU 423, the CPU executes the 5GNR RRC to process the UL 5GNR signaling and DL 5GNR signaling to generate new UL 5GNR signaling and new DL 5GNR signaling. The 5GNR RRC transfers the new UL 5GNR signaling to an Access and Mobility Management Function (AMF) in NFVI 430 over the data I/O and backhaul. The 5GNR SDAP transfers the UL 5GNR data to a User Plane Function (UPF) in NFVI 430 over the data I/O and backhaul links. The 5GNR RRC receives the DL 5GNR signaling from the AMF. The 5GNR SDAP receives DL 5GNR data from the UPF.

In LTE BBU 424, the CPU executes the LTE RRC to process the UL LTE signaling and DL LTE signaling to generate new UL LTE signaling and new DL LTE signaling. The LTE RRC transfers the new UL LTE signaling to a Mobility Management Entity (MME) in NFVI 430 over the data I/O and backhaul. The LTE PDCP transfers the UL LTE data to a Serving Gateway (SGW) in NFVI 430 over the data I/O and backhaul links. The LTE RRC receives the DL LTE signaling from the MME. The LTE PDCP receives DL LTE data from the SGW.

The 5GNR network applications in 5GNR BBU 423 process the DL 5GNR signaling and DL 5GNR data to generate corresponding DL 5GNR symbols that represent the DL 5GNR signaling and DL 5GNR data in the frequency domain. The LTE network applications in LTE BBU 424 process the DL LTE signaling and DL LTE data to generate corresponding DL LTE symbols that represent the DL LTE signaling and DL LTE data in the frequency domain.

In radios 421-422, the DSPs processes the DL 5GNR/LTE symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless signals that transport the DL 5GNR/LTE signaling and DL 5GNR/LTE data to 5GNR/LTE UE 410.

RRC functions comprise authentication, security, handover control, status reporting, QoS, network broadcasts and pages, and network selection. PDCP functions comprise LTE/5GNR allocations, security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

In 5GNR/LTE access nodes 420, the 5GNR MAC increases or decreases the 5GNR UL transmit power for UE 410 to maintain the received signal strength at access nodes 420 at a common level for all 5GNR UEs. The 5GNR MAC signals the 5GNR UL power control to the 5GNR MAC in UE 410. The LTE MAC increases or decreases the LTE UL transmit power for UE 410 to maintain the received signal strength at access nodes 420 at a common level for all LTE UEs. The LTE MAC signals the LTE UL power control to the LTE MAC in UE 410.

The 5GNR MAC performs HARQ on the 5GNR UL. The 5GNR PHY determines 5GNR UL path loss and signals the 5GNR UL path loss for UE 410 to the 5GNR RRC. The 5GNR RRC signals the 5GNR UL path loss to the 5GNR RRC in UE 410. The LTE MAC performs HARQ on the LTE UL. The LTE PHY determines LTE UL path loss and signals the LTE UL path loss for UE 410 to the LTE RRC. The LTE RRC signals the LTE UL path loss to the LTE RRC in UE 410.

The LTE RRC in access nodes 420 receives signaling from the LTE RRC in UE 410 that indicates three decibel increases or decreases in the LTE UL transmit power. The LTE RRC notifies the LTE MAC of the UL transmit power changes for use in network power control. The 5GNR RRC in access nodes 420 receives signaling from the 5GNR RRC in UE 410 that indicates power on/off status. The 5GNR RRC notifies the 5GNR MAC of the UL transmit on/off status for use in network power control.

The 5GNR RRC in access nodes 420 may receive service instructions from the 5GNR RRC in UE 410 for delivery to the AMF in NFVI 430. The 5GNR RRC in access nodes 420 transfers the service instructions to the MME in NFVI 430. For example, the 5GNR RRC in access nodes 420 may receive a Tracking Area Update (TAU) from UE 410 that has an instruction to disable or enable 5GNR service. The 5GNR RRC forwards the TAU to the AMF in NFVI 430 to disable or enable the 5GNR service for UE 410. Alternatively, the LTE RRC in access nodes 420 may receive service instructions from the LTE RRC in UE 410 for delivery to the MME in NFVI 430. The LTE RRC in access nodes 420 transfers the service instructions to the MME. For example, the LTE RRC in access nodes 420 may receive a TAU with an instruction to disable or enable the 5GNR service for UE 410. The LTE RRC forwards the TAU to the MME to disable or enable the 5GNR service for UE 410.

Figure 6:
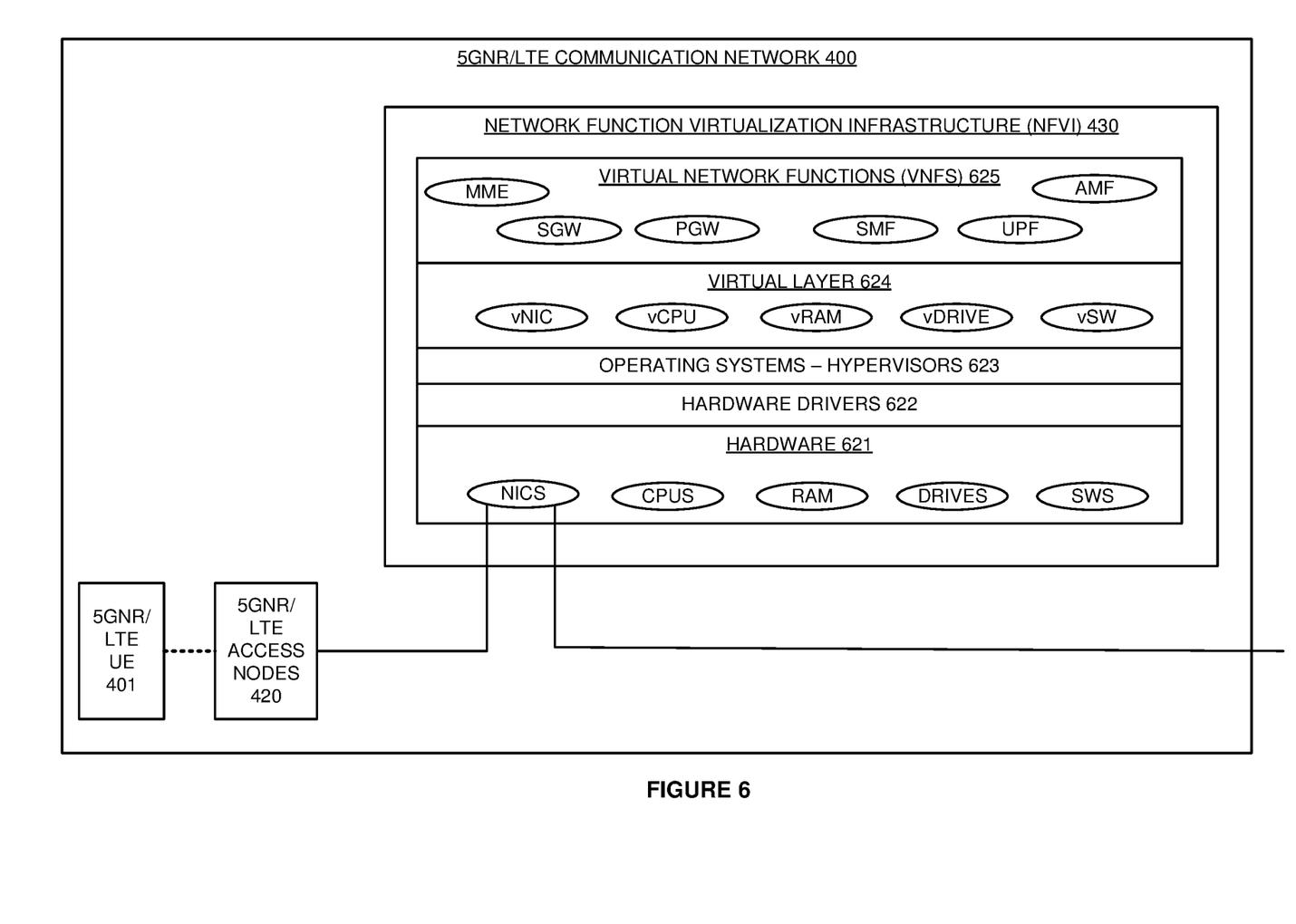
FIG. 6 illustrates a 5GNR/LTE Network Function Virtualization Infrastructure (NFVI) in the 5GNR/LTE communication network that serves the 5GNR/LTE UE which controls power consumption based on UL HARQ BLER and UL path loss.

FIG. 6 illustrates a 5GNR/LTE Network Function Virtualization Infrastructure (NFVI) 430 in the 5GNR/LTE communication network 400 that serves the 5GNR/LTE UE 410 which controls power consumption based on UL HARQ BLER and UL path loss. NFVI 430 is an example of network elements 130, although network elements 130 may differ. NFVI 430 comprises hardware 621, hardware drivers 622, operating systems and hypervisors 623, virtual layer 624, and Virtual Network Functions (VNFs) 625. Hardware 621 comprises Network Interface Cards (NICs), CPUs, RAM, flash/disk drives, and data switches (SWS). Virtual layer 624 comprises virtual NICs (vNIC), virtual CPUs (vCPU), virtual RAM (vRAM), virtual Drives (vDRIVE), and virtual Switches (vSW). The NICs in NFVI 420 are coupled to 5GNR/LTE access nodes 420 over backhaul links. VNFs 425 comprise MME, SGW, PGW, AMF, SMF, UPF, and the like. Hardware 621 executes hardware drivers 622, operating systems and hypervisors 623, virtual layer 624, and VNFs 625 to serve UE 410 with data services over 5GNR/LTE access nodes 420.

The AMF may receive service instructions from the 5GNR RRC in UE 410 to terminate 5GNR service for UE 410. In response, the AMF signals the SMF to disable the 5GNR service for UE 410. The SMF signals the UPF to terminate the 5GNR bearer for UE 410. The UPF terminates the 5GNR bearer for UE 410. The AMF signals the 5GNR RRC in access nodes 420 to disable the 5GNR service for UE 410. The 5GNR RRC in access nodes 420 terminates the 5GNR bearer for UE 410. The service instruction may be a Tracking Area Update (TAU) from UE 410 that has the instruction to disable 5GNR service. In some examples, the MME may receive service instructions from the LTE RRC in UE 410 to terminate 5GNR service for UE 410. In response, the MME signals the AMF and/or the SGW to disable the 5GNR service for UE 410.

The AMF may receive service instructions from the 5GNR RRC in UE 410 to restart the 5GNR service for UE 410. In response, the AMF signals the SMF to restart the 5GNR service for UE 410, and the SMF signals the UPF to start a new 5GNR bearer for UE 410. The UPF starts the 5GNR bearer for UE 410. The AMF signals the 5GNR RRC in access nodes 420 to enable the 5GNR service for UE 410. The 5GNR RRC in access nodes 420 starts the 5GNR bearer for UE 410. The service instruction may be a TAU from UE 410 that has the instruction to enable 5GNR service. In some examples, the MME may receive service instructions from the LTE RRC in UE 410 to enable 5GNR service for UE 410. In response, the MME signals the AMF and/or the SGW to enable the 5GNR service for UE 410.

Figure 7:
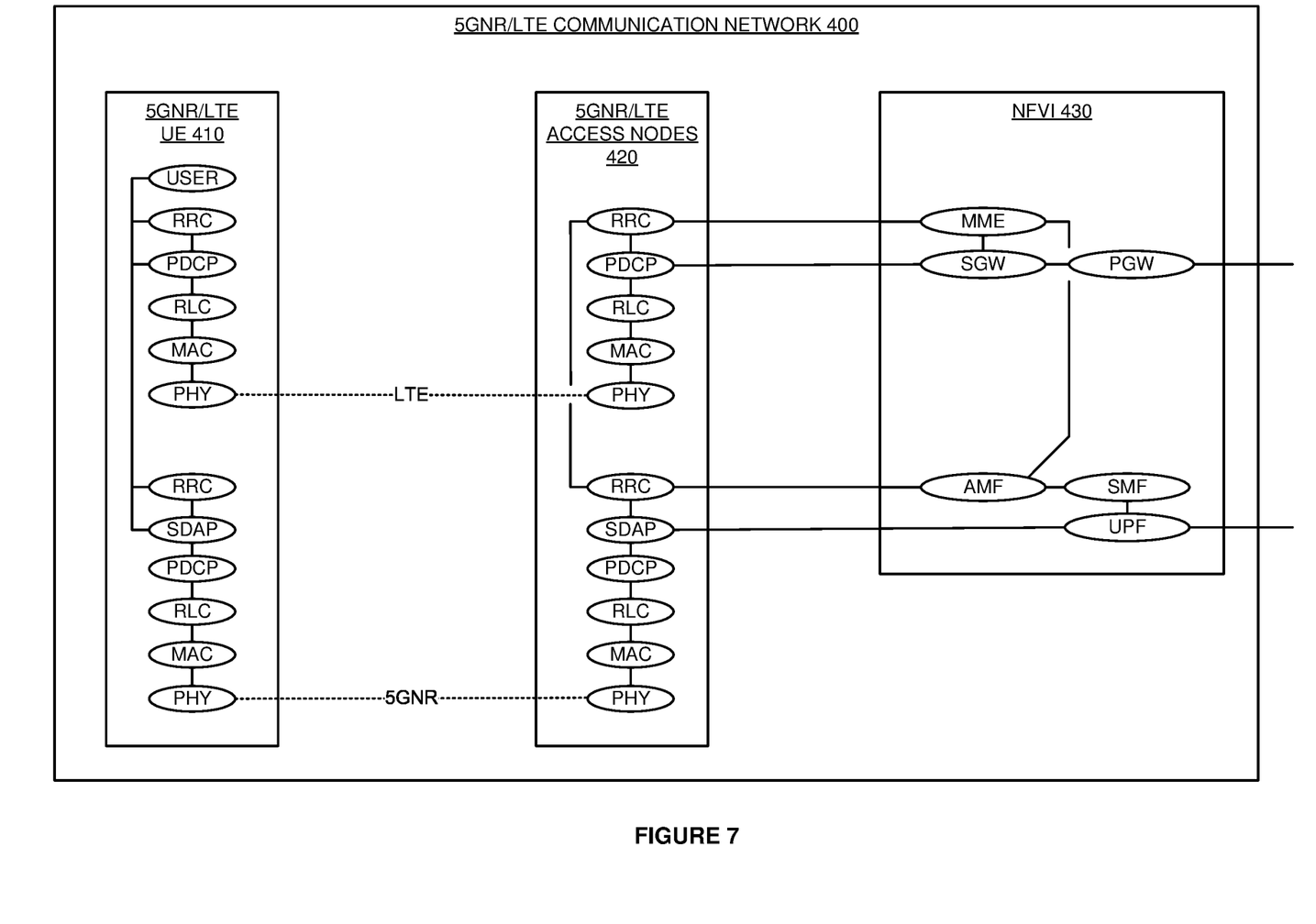
FIG. 7 illustrates the operation of the 5GNR/LTE communication network when the 5GNR/LTE UE controls power consumption based on UL HARQ BLER and UL path loss.

FIG. 7 illustrates the operation of the 5GNR/LTE communication network 400 when 5GNR/LTE UE 410 controls power consumption based on UL HARQ BLER and UL path loss. In 5GNR/LTE access nodes 420, the 5GNR MAC increases or decreases the 5GNR UL transmit power for UE 410 to maintain the received signal strength at access nodes 420 at a common level for all 5GNR UEs. The 5GNR MAC signals the 5GNR UL power control to the 5GNR MAC in UE 410. In 5GNR/LTE access nodes 420, the LTE MAC increases or decreases the LTE UL transmit power for UE 410 to maintain the received signal strength at access nodes 120 at a common level for all LTE UEs. The LTE MAC signals the LTE UL power control to the LTE MAC in UE 410.

In 5GNR/LTE UE 410, the 5GNR MAC selects an UL 5GNR transmit power based on power control instructions from the 5GNR MAC in access nodes 420. The 5GNR MAC selects an UL 5GNR transmit power based on power control instructions from the 5GNR MAC in access nodes 420. In UE 410, the 5GNR MAC controls the 5GNR UL transmit power. The 5GNR PHY in UE 410 transfers 5GNR signals having the 5GNR UL transmit power to the 5GNR PHY in access nodes 420. The 5GNR PHY in access nodes 420 transfers corresponding UL signals to the 5GNR RRC and SDAP. The 5GNR RRC transfers corresponding UL signaling to the AMF, and the SDAP transfers corresponding UL data to the UPF. The UPF transfers the UL data.

In 5GNR/LTE UE 410, the LTE MAC selects an UL LTE transmit power based on power control instructions from the LTE MAC in access nodes 420. In UE 410, the LTE MAC controls the LTE UL transmit power. The LTE PHY in UE 410 transfers LTE signals at the UL transmit power to the LTE PHY in access nodes 420. The LTE PHY in access nodes 420 transfers corresponding UL signals to the LTE RRC and PDCP. The LTE RRC transfers corresponding UL signaling to the MME, and the PDCP transfers corresponding UL data to the SGW. The SGW transfers the UL data to the PGW, and the PGW transfer the UL data.

In 5GNR/LTE access nodes 420, the 5GNR PHY determines 5GNR UL path loss for UE 410, and the LTE PHY determines LTE UL path loss for UE 410. The 5GNR PHY transfers the UL path loss metrics to the 5GNR RRC which forwards the path loss metrics to the 5GNR RRC in UE 410. The 5GNR RRC in UE 410 averages the UL 5GNR path loss for approximately 100 milliseconds. The LTE PHY transfers the UL path loss metrics to the LTE RRC which forwards the path loss metrics to the LTE RRC in UE 410. The LTE RRC in UE 410 averages the UL LTE path loss for approximately 100 milliseconds.

In UE 410 and access nodes 420, the 5GNR MACs perform HARQ on the 5GNR UL, and LTE MACs perform HARQ on the LTE UL. In UE 410, the 5GNR MAC averages the UL 5GNR BLER for approximately 100 milliseconds and notifies the 5GNR RRC. The LTE MAC averages the UL LTE BLER for approximately 100 milliseconds and notifies the LTE RRC. In UE 410, the 5GNR RRC compares the average 5GNR UL HARQ BLER to a 5GNR error threshold and compares the average 5GNR UL path loss to a loss threshold. The LTE RRC compares the average LTE UL HARQ BLER to an LTE error threshold and compares the average LTE UL path loss to a loss threshold. The 5GNR RRC notifies the LTE RRC when the 5GNR UL HARQ BLER and the 5GNR UL path loss both exceed their error thresholds. The LTE RRC notifies the 5GNR RRC when the LTE UL HARQ BLER and the LTE UL path loss both exceed their error thresholds. When the 5GNR UL HARQ BLER, LTE UL HARQ BLER, 5GNR UL path loss, and the LTE UL path loss all exceed their thresholds, the LTE RRC directs the LTE MAC to increase LTE UL transmit power by three decibels, and the 5GNR RRC directs the 5GNR MAC to decrease 5GNR UL transmit power to zero. The 5GNR MAC powers-down the 5GNR UL. The LTE MAC increases the transmit power on the UL.

In response to the 5GNR UL power-off, the 5GNR RRC in UE 410 signals the AMF in NFVI 430 over access nodes 420 to terminate 5GNR service. The AMF in NFVI 430 terminates the 5GNR service for UE 410 by signaling the SMF which signals the UPF to terminate the bearer for UE 410. The AMF also signals access nodes 420 to terminate the 5GNR bearer for UE 410. Alternatively, the LTE RRC in UE 410 may signal the MME in NFVI 430 over access nodes 420 to terminate 5GNR service. The MME in NFVI 430 terminates the 5GNR service for UE 410 by signaling the AMF which signals the SMF, and the SMF signals the UPF to terminate the bearer for UE 410. The MME also signals access nodes 420 to terminate the 5GNR bearer for UE 410.

After the 5GNR UL power-down, the LTE MAC performs HARQ on the LTE UL, averages the UL LTE BLER for approximately 100 milliseconds, and notifies the LTE RRC. 5GNR/LTE access nodes 420 determine LTE UL path loss for UE 410 and transfer the LTE UL path loss metrics to the LTE RRC in UE 410. The LTE RRC in UE 410 averages the UL LTE path loss for approximately 100 milliseconds. The LTE RRC compares the average LTE UL HARQ BLER to a 5GNR restoration threshold and compares the average LTE UL path loss to a 5GNR restoration threshold. The LTE RRC notifies the 5GNR RRC when the LTE UL HARQ BLER and the LTE UL path loss fall below the 5GNR restoration thresholds. When the LTE UL HARQ BLER and the LTE UL path loss both fall below the 5GNR restoration thresholds, the LTE RRC directs the LTE MAC to decrease LTE UL transmit power by three decibels, and the 5GNR RRC directs the 5GNR MAC to increase 5GNR UL transmit power back to a default value like 23 decibels. The 5GNR MAC powers-up the 5GNR UL. The LTE MAC powers-down the LTE UL.

In response to the 5GNR UL power-up, the 5GNR RRC in UE 410 signals the AMF in NFVI 430 over access nodes 420 to restart the 5GNR service. The AMF in NFVI 430 signals the SMF which controls the UPF to start a new 5GNR bearer for UE 410. Alternatively, the LTE RRC in UE 410 may signal the MME in NFVI 430 over access nodes 120 to restart the 5GNR service, and the MME signals the AMF to start the 5GNR service.

The LTE RRC in access nodes 420 receives signaling from the LTE RRC in UE 410 that indicates the three decibel increases or decreases in the LTE UL transmit power. The LTE RRC notifies the LTE MAC of the UL transmit power changes for use in network power control. The 5GNR RRC in access nodes 420 receives signaling from the 5GNR RRC in UE 410 that indicates power on/off status. The 5GNR RRC notifies the 5GNR MAC of the UL transmit on/off status for use in network power control.

5GNR/LTE network 400 uses a Stand Alone (SA) architecture for LTE and 5GNR. In networks with a Non-SA (NSA) architecture for 5GNR, the LTE RRC handles the tasks of the 5GNR RRC which is omitted. For 5GNR NSA, the MME, SGW, and PGW handle the tasks of the AMF, SMF, and UPF as described for the SA architecture. In networks with an NSA architecture for LTE, the 5GNR RRC handles the tasks of the LTE RRC which is omitted. For LTE NSA, the AMF, SMF, and UPF handle the tasks of the MME, SGW, and PGW as described for the SA architecture.

Figure 8:
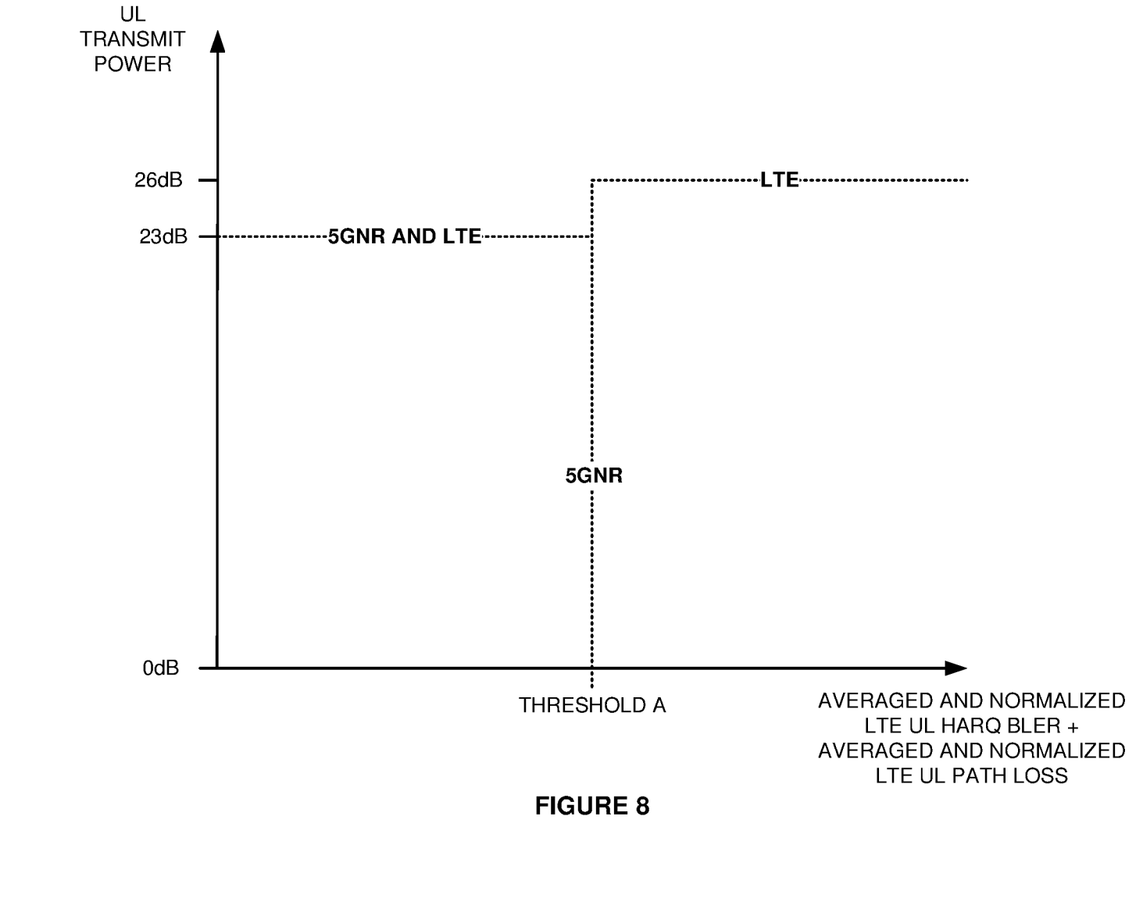
FIG. 8 illustrates the operation of the 5GNR/LTE UE to control power consumption based on UL HARQ BLER and UL path loss in the 5GNR/LTE communication network.

FIG. 8 illustrates the operation of 5GNR/LTE UE 410 to control power consumption based on UL HARQ BLER in 5GNR/LTE communication network 400. The vertical axis represents UL transmit power. The horizontal axis represents a sum of the average LTE UL HARQ BLER and the average LTE UL path loss which were normalized before summing. When the sum of the averaged and normalized LTE UL HARQ BLER and the averaged and normalized LTE UL path loss exceeds a threshold "A", then the 5GNR UL transmit power decreases from 23 Decibels (dB) to 0 dB, and the LTE UL transmit power increases from 23 dB to 26 dB. When the sum of the averaged and normalized LTE UL HARQ BLER and the averaged and normalized LTE UL path loss falls below threshold A, then the 5GNR UL transmit power increases from 0 dB to 23 dB, and the LTE UL transmit power decreases from 26 dB to 23 dB.

The wireless data network circuitry described above comprises computer hardware and software that form special-purpose network circuitry to control wireless communication power consumption based on UL HARQ BLER. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control wireless communication power consumption based on UL HARQ BLER.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Fifth Generation New Radio (5GNR)/Long Term Evolution (LTE) User Equipment (UE) to control power consumption, the method comprising:
   control circuitry selecting an initial 5GNR transmit power and an initial LTE transmit power, signaling the initial 5GNR transmit power to a 5GNR radio, and signaling the initial LTE transmit power to an LTE radio;
   the 5GNR radio transmitting initial 5GNR signals at the initial 5GNR transmit power;
   the LTE radio transmitting initial LTE signals at the initial LTE transmit power;
   the control circuitry averaging Uplink (UL) Hybrid Automatic Repeat Request (HARQ) Block Error Rate (BLER) for an error sampling period and comparing the average UL HARQ BLER for the error sampling period to an error threshold;

when the average UL HARQ BLER exceeds the error threshold, the control circuitry selecting a lower 5GNR transmit power and a higher LTE transmit power, signaling the lower 5GNR transmit power to the 5GNR radio, and signaling the higher LTE transmit power to the LTE radio; and the LTE radio transmitting subsequent LTE signals at the higher LTE transmit power.

2. The method of claim 1 wherein the UL HARQ BLER comprises LTE UL HARQ BLER.

3. The method of claim 2 further comprising the 5GNR radio transmitting subsequent 5GNR signals at the lower 5GNR transmit power.

4. The method of claim 1 wherein the initial LTE transmit power comprises 23 decibels, the initial 5GNR transmit power comprises 23 decibels, the higher LTE transmit power comprises 26 decibels, and the lower 5GNR transmit power comprises 0 decibels.

5. The method of claim 4 wherein the error sampling period is greater than 90 milliseconds.

6. The method of claim 5 wherein the initial LTE transmit power comprises 23 decibels, the initial 5GNR transmit power comprises 23 decibels, the higher LTE transmit power comprises 26 decibels, and the lower 5GNR transmit power comprises 0 decibels.

7. The method of claim 6 wherein the error sampling period is greater than 90 milliseconds.

8. The method of claim 1 further comprising:

the control circuitry averaging UL path loss for a loss sampling period and comparing the average UL path loss to a loss threshold; and wherein the control circuitry selecting the lower 5GNR transmit power and the higher LTE transmit power when the average UL HARQ BLER exceeds the error threshold comprises selecting the lower 5GNR transmit power and the higher LTE transmit power when both the average UL HARQ BLER exceeds the error threshold and the average UL path loss exceeds the loss threshold.

9. The method of claim 8 wherein the UL HARQ BLER comprises LTE UL HARQ BLER and the UL path loss comprises LTE UL path loss.

10. The method of claim 9 further comprising the 5GNR radio transmitting subsequent 5GNR signals at the lower 5GNR transmit power.

11. A Fifth Generation New Radio (5GNR)/Long Term Evolution (LTE) User Equipment (UE) to control power consumption, the 5GNR/LTE UE comprising:

control circuitry configured to select an initial 5GNR transmit power and an initial LTE transmit power, signal the initial 5GNR transmit power to a 5GNR radio, and signal the initial LTE transmit power to an LTE radio;

the 5GNR radio configured to transmit initial 5GNR signals at the initial 5GNR transmit power;

the LTE radio configured to transmit initial LTE signals at the initial LTE transmit power;

the control circuitry configured to average Uplink (UL) Hybrid Automatic Repeat Request (HARQ) Block Error Rate (BLER) for an error sampling period and compare the average UL HARQ BLER for the error sampling period to an error threshold;

when the average UL HARQ BLER exceeds the error threshold, the control circuitry configured to select a lower 5GNR transmit power and a higher LTE transmit power, signal the lower 5GNR transmit power to the 5GNR radio, and signal the higher LTE transmit power to the LTE radio; and the LTE radio configured to transmit subsequent LTE signals at the higher LTE transmit power.

12. The 5GNR/LTE UE of claim 11 wherein the UL HARQ BLER comprises LTE UL HARQ BLER.

13. The 5GNR/LTE UE of claim 12 further comprising the 5GNR radio configured to transmit subsequent 5GNR signals at the lower 5GNR transmit power.

14. The 5GNR/LTE UE of claim 11 wherein the initial LTE transmit power comprises 23 decibels, the initial 5GNR transmit power comprises 23 decibels, the higher LTE transmit power comprises 26 decibels, and the lower 5GNR transmit power comprises 0 decibels.

15. The 5GNR/LTE UE of claim 14 wherein the error sampling period is greater than 90 milliseconds.

16. The 5GNR/LTE UE of claim 11 further comprising:

the control circuitry configured to average UL path loss for a loss sampling period and compare the average UL path loss to a loss threshold; and wherein the control circuitry is configured to select the lower 5GNR transmit power and the higher LTE transmit power when both the average UL HARQ BLER exceeds the error threshold and the average UL path loss exceeds the loss threshold.

17. The 5GNR/LTE UE of claim 16 wherein the UL HARQ BLER comprises LTE UL HARQ BLER and the UL path loss comprises LTE UL path loss.

18. The 5GNR/LTE UE of claim 17 further comprising the 5GNR radio configured to transmit subsequent 5GNR signals at the lower 5GNR transmit power.

19. The 5GNR/LTE UE of claim 16 wherein the initial LTE transmit power comprises 23 decibels, the initial 5GNR transmit power comprises 23 decibels, the higher LTE transmit power comprises 26 decibels, and the lower 5GNR transmit power comprises 0 decibels.

20. The 5GNR/LTE UE of claim 19 wherein the error sampling period is greater than 90 milliseconds.

* * * * *